United States Patent
Domke

(10) Patent No.: US 10,451,048 B2
(45) Date of Patent: Oct. 22, 2019

(54) ELECTRICAL CONTROL VALVE FOR AN AIR CONDITIONING COMPRESSOR

(71) Applicant: TE Connectivity Germany GmbH, Bensheim (DE)

(72) Inventor: Daniel Domke, Frankenthal (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 15/459,757

(22) Filed: Mar. 15, 2017

(65) Prior Publication Data

US 2017/0184082 A1    Jun. 29, 2017

Related U.S. Application Data

(63) Continuation of application No. PCT/EP2015/071188, filed on Sep. 16, 2015.

(30) Foreign Application Priority Data

Sep. 16, 2014    (DE) .................. 10 2014 218 525

(51) Int. Cl.
*F04B 27/18*    (2006.01)
*F04B 53/10*    (2006.01)
(Continued)

(52) U.S. Cl.
CPC .......... *F04B 27/1804* (2013.01); *F04B 27/18* (2013.01); *F04B 53/10* (2013.01);
(Continued)

(58) Field of Classification Search
CPC .......... F04B 27/1804; F04B 2027/1813; F04B 2027/1827; F04B 2027/1845; F04B 2027/1854
See application file for complete search history.

(56) References Cited

U.S. PATENT DOCUMENTS

| 6,390,782 B1 | 5/2002 | Booth et al. |
| 6,460,567 B1 | 10/2002 | Hansen, III et al. |

(Continued)

FOREIGN PATENT DOCUMENTS

| CN | 1382596 A | 12/2002 |
| CN | 1436932 A | 8/2003 |

(Continued)

OTHER PUBLICATIONS

PCT International Preliminary Report on Patentability and Written Opinion, dated Mar. 21, 2017, 7 pages.

(Continued)

*Primary Examiner* — Patrick Hamo
(74) *Attorney, Agent, or Firm* — Barley Snyder

(57) ABSTRACT

A control valve for an air conditioning compressor is disclosed. The control valve comprises a control piston, an electric motor, a sensor, and a control unit. The control piston connects a refrigerant flow between a high-pressure area and a crankcase pressure area of the air conditioning compressor in a first position. The control piston further connects the refrigerant flow between the crankcase pressure area and a low-pressure area of the air conditioning compressor in a second position. The electric motor moves the control piston between the first position and the second position. The sensor determines the position of the control piston. The control unit is connected to the sensor and the electric motor. The control unit controls the electric motor to move the control piston and control the refrigerant flow based on the position of the control piston determined by the sensor.

14 Claims, 2 Drawing Sheets

(51) Int. Cl.
*F16K 37/00* (2006.01)
*F16K 31/04* (2006.01)
*F25B 1/02* (2006.01)

(52) U.S. Cl.
CPC ............ *F16K 31/04* (2013.01); *F16K 31/041* (2013.01); *F16K 37/0025* (2013.01); *F16K 37/0033* (2013.01); *F25B 1/02* (2013.01)

(56) References Cited

U.S. PATENT DOCUMENTS

| | | | |
|---|---|---|---|
| 6,557,360 B2 * | 5/2003 | Matsubara | B60H 1/3208 62/133 |
| 6,772,990 B2 | 8/2004 | Sasaki et al. | |
| 7,000,892 B2 | 2/2006 | Kim et al. | |
| 9,316,237 B1 * | 4/2016 | Mullen | F15B 13/0444 |
| 2003/0145615 A1 | 8/2003 | Sasaki et al. | |
| 2005/0062003 A1 * | 3/2005 | Kim | F16K 11/07 251/129.04 |
| 2008/0206074 A1 * | 8/2008 | Brandes | F04B 27/1804 417/307 |
| 2014/0318641 A1 | 10/2014 | Gentile et al. | |
| 2014/0326908 A1 | 11/2014 | Schober et al. | |

FOREIGN PATENT DOCUMENTS

| | | | |
|---|---|---|---|
| CN | 103375381 A | | 10/2013 |
| DE | 10058441 A1 | | 5/2001 |
| DE | 102006024069 A1 | | 11/2007 |
| DE | 102011005868 A1 | | 9/2012 |
| DE | 10 2011 117 354 A1 | | 5/2013 |
| DE | 102012109206 A1 | | 6/2013 |
| EP | 2784320 A2 | | 10/2014 |
| JP | 3809161 B2 | | 5/2006 |
| JP | 4246975 B2 | | 1/2009 |
| JP | 2014-234777 A | | 12/2014 |
| KR | 2002-0075206 A | | 10/2002 |
| KR | 10-0430052 B1 | | 5/2004 |

OTHER PUBLICATIONS

Abstract of DE102006024069, dated Nov. 29, 2007, 1 page.
German Office Action, dated May 2, 2016, 8 pages.
Abstract of DE 10 2011 117 354, dated , 1 pages.
Korean Office Action and English Summary, dated May 10, 2018, 13 pages.
Chinese First Office Action and English translation, dated Apr. 26, 2018, 17 pages.
Japanese Notice of Reasons for Refusal, dated Mar. 6, 2018, 5 pages.
German Office Action, German Patent Application No. 10 2014 218 525.4, dated Jun. 17, 2015, 6 pages.
English machine translation of JP 2014-234777, accessed Jun. 15, 2015, 8 pages.

* cited by examiner

ELECTRICAL CONTROL VALVE FOR AN AIR CONDITIONING COMPRESSOR

CROSS-REFERENCE TO RELATED APPLICATIONS

This application is a continuation of PCT International Application No. PCT/EP2015/071188, filed on Sep. 16, 2015, which claims priority under 35 U.S.C. § 119 to German Patent Application No. 102014218525.4, filed on Sep. 16, 2014.

FIELD OF THE INVENTION

The present invention relates to an electrical control valve, and more particularly, to an electrical control valve for an air conditioning compressor.

BACKGROUND

Air conditioning compressors are known in the art, such as from DE 10 2011 117 354 A1, for example. Pistons are arranged in a crank casing of the air conditioning compressor in order to pump refrigerant into a pressure chamber. In the process, the movement of the pistons is guided by a rotating wobble plate. If the wobble plate, which is rotated via a belt drive, for example, has a tilt angle different from zero, this leads to an axial stroke movement of the pistons as they turn around the wobble plate's axis of rotation. In the process, refrigerant is sucked up by the suction chamber of the air conditioning compressor and pumped into the pressure chamber.

The known air conditioning compressor is mounted in a motor vehicle. The suction chamber is connected to the low-pressure-side connector of the air conditioning compressor, which is connected to the low-pressure area of the air conditioning system, such as the condenser's outlet. The pressure chamber is connected to the high-pressure-side outlet of the air conditioning compressor, which is connected to the high-pressure area of the climate system, such as a heat exchanger with the inlet of the condenser.

To adapt the displacement volume and control the flow of refrigerant, varying the tilt angle of the wobble plate in the air conditioning compressor is already known. For example, if the air conditioning compressor is preset for a maximum displacement volume, a pivoting back of the wobble plate brings about a decrease in the axial hub stroke of the pistons and thus a reduction of the displacement volume.

Furthermore, controlling the refrigerant flow by a control valve is also known. The control valve is connected to the high-pressure area, the low pressure area and the crankcase pressure area and controls the flow of refrigerant between the three areas. If the control valve, in one position, opens a connection between the high-pressure area and crankcase pressure area, refrigerant flows from the high-pressure area into the crankcase pressure area; there is a pressure rise in the crankcase pressure area. If the control valve, in another position, opens a connection between the crankcase pressure area and the low-pressure area of the air conditioning compressor, refrigerant flows from the crankcase pressure area into the low-pressure area; there is a pressure fall in the crankcase pressure area.

The pressure rise in the crankcase pressure area controlled by the control valve brings about a pivoting back of the wobble plate. Thus, the axial stroke movement of the air conditioning compressor's pistons decreases and the displacement volume of the air conditioning compressor is reduced. Consequently, the pressure does not increase further in the high-pressure area of the air conditioning system. The pressure fall in the crankcase pressure area controlled by control valve brings about a swinging out (i.e. tipping) of the wobble plate. Thus the axial stroke movement of the air conditioning compressor's pistons increases and the displacement volume of the air conditioning compressor is made larger. Consequently, the pressure increases further in the high-pressure area of the air conditioning system. Usually, the wobble plate is held in the tipped starting position by spring tension, so that if there is a later fall in pressure in the crankcase pressure area the wobble plate pivots into the starting position again and provides a starting position with regard to the displacement volume in the air conditioning compressor.

A control valve 100 known in the art and used for an air conditioning compressor to control a refrigerant flow from a high-pressure area into a crankcase pressure area, and from the crankcase pressure area into a low-pressure area, is shown in FIG. 1. Actuation of the control valve 100 takes place through the movement of a control piston 104. The control piston 104 comprises an actuation rod 106 with at least one seal body 108. The actuation rod 106 moves in and in opposition to the longitudinal direction of the control piston 104, so that the seal body 108 respectively opens or blocks the passage between a high-pressure area Pd and a crankcase area Pc in the control valve 100.

The movement of the control piston 104 is guided by a longitudinal bore in the casing of the control valve 100. Furthermore, lateral recesses Ps, Pd and Pc are provided in the casing for the connection of the high-pressure area Pd, the low-pressure area Ps, and the crankcase pressure area Pc. The seal body 108 is conical to cooperate with an annular inlet/outlet aperture in the passage between the high-pressure area Pd and the crankcase pressure area Pc and in the passage between the crankcase pressure area Pc and the low-pressure area Ps.

If the control piston 104 is moved into a first position, the seal body 108 opens the passage from the high-pressure area Pd into the crankcase pressure area Pc. At the same time, the passage between the crankcase pressure area Pc and the low-pressure area Ps is sealed. Consequently, refrigerant can flow from the high-pressure area Pd into the crankcase pressure area Pc and can provide a rise in pressure there. The first position of the control valve 100 results in the air conditioning compressor being regulated downwards.

If the control piston 104 is moved into a second position, the seal body 108 opens the passage between the crankcase pressure area Pc and the low-pressure area Ps. At the same time, the passage between the high-pressure area Pd and the crankcase pressure area Pc is sealed. Consequently, refrigerant will flow from the crankcase pressure area Pc into the low-pressure area Ps and provide a fall in pressure in the crankcase pressure area Pc. The second position of the control valve 100 results in the air conditioning compressor being regulated up.

The movement of the control piston 104 is brought about by an electromagnetic annular coil 102 arranged to the side of the actuation rod 106. If power is fed into the annular coil 102, there is induced in the interior of the coil a magnetic field which interacts with the end of the actuation rod 106 of the control piston 104 arranged inside the annular coil. The end of the actuation rod 106 of the control piston 104 arranged inside the annular coil 102 is made of ferromagnetic material.

In control valves 100 operated with an electromagnetic annular coil 102, however, control of the movement of the control piston 104 between the first and the second position is imprecise. The mechanical and magnetic interactions between the annular coil 102 and the end of the actuation rod 106 of the control piston 104 arranged therein result in a hysteresis in the movement of the control piston 104 with regard to the power fed into the annular coil 102. Furthermore, the high and low pressures respectively acting on the seal body 108 in the high-pressure area Pd and the low-pressure area Ps are variable and counteract the induced magnetic field. Thus, by way of example, in the event of a higher pressure in the high-pressure area Pd, a stronger magnetic field is required, for example to move the control piston 104 from one position into the second. Furthermore, precise control of the control valve 100 is difficult due to the complicated nature of ascertaining the location of the control piston 104 and is not energy efficient, for example, because a constant flow of current in the electromagnetic annular coil 102 is necessary even to keep the control piston 104 in the closed position.

SUMMARY

An object of the invention, among others, is to provide a cost and energy-efficient control valve which enables precise control of the movement of a control piston. The disclosed control valve comprises a control piston, an electric motor, a sensor, and a control unit. The control piston connects a refrigerant flow between a high-pressure area and a crankcase pressure area of the air conditioning compressor in a first position. The control piston further connects the refrigerant flow between the crankcase pressure area and a low-pressure area of the air conditioning compressor in a second position. The electric motor moves the control piston between the first position and the second position. The sensor determines the position of the control piston. The control unit is connected to the sensor and the electric motor. The control unit controls the electric motor to move the control piston and control the refrigerant flow based on the position of the control piston determined by the sensor.

BRIEF DESCRIPTION OF THE DRAWINGS

The invention will now be described by way of example with reference to the accompanying figures, of which.

DETAILED DESCRIPTION OF THE EMBODIMENTS

Figure 2A:
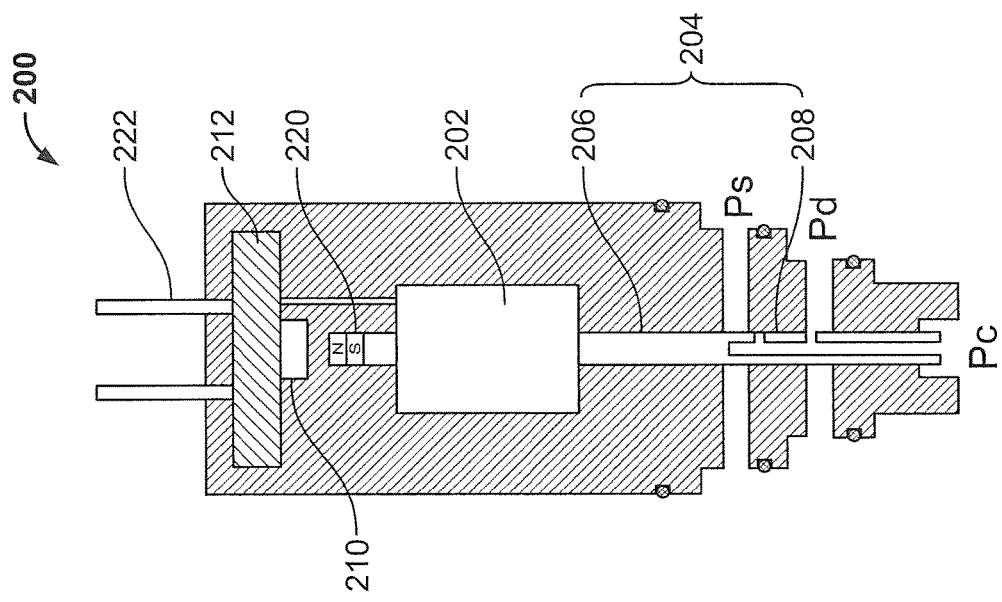
FIG. 2a is a sectional view of a control valve for an air conditioning compressor according to the invention in a first position.
Figure 1:
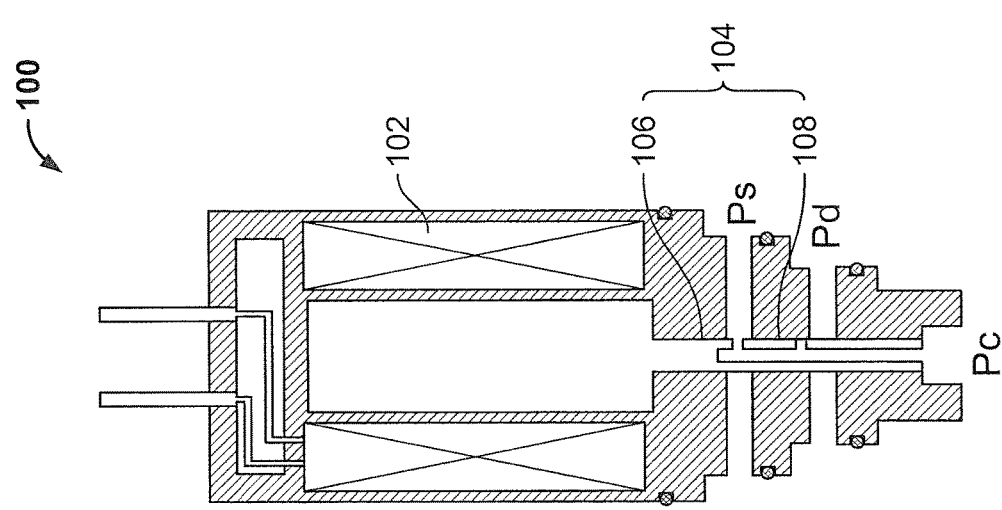
FIG. 1 is a sectional view of a control valve for an air conditioning compressor according to the prior art.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

Figure 2B:
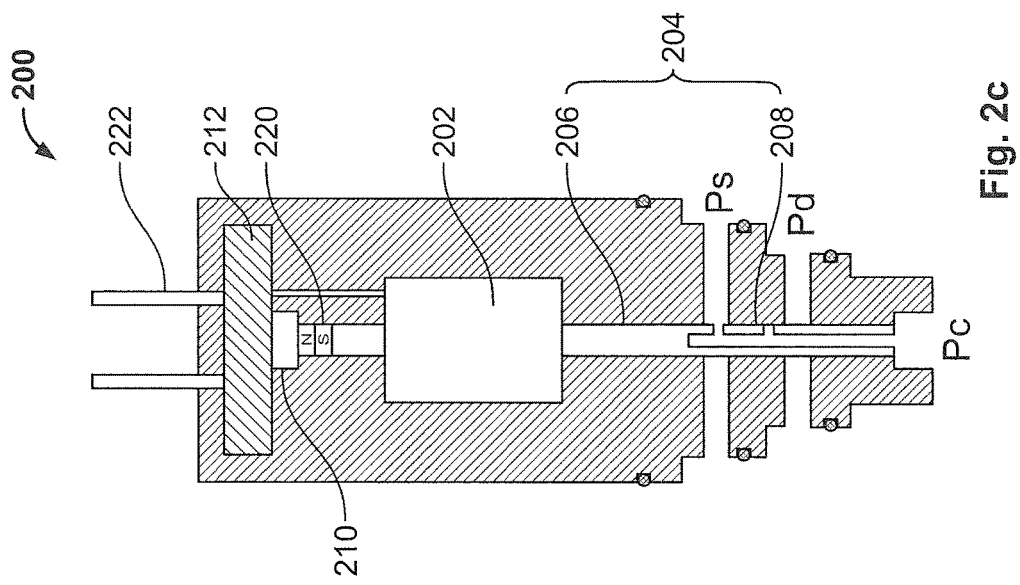
FIG. 2b is a sectional view of the control valve of FIG. 2a in an intermediate position.
Figure 2C:
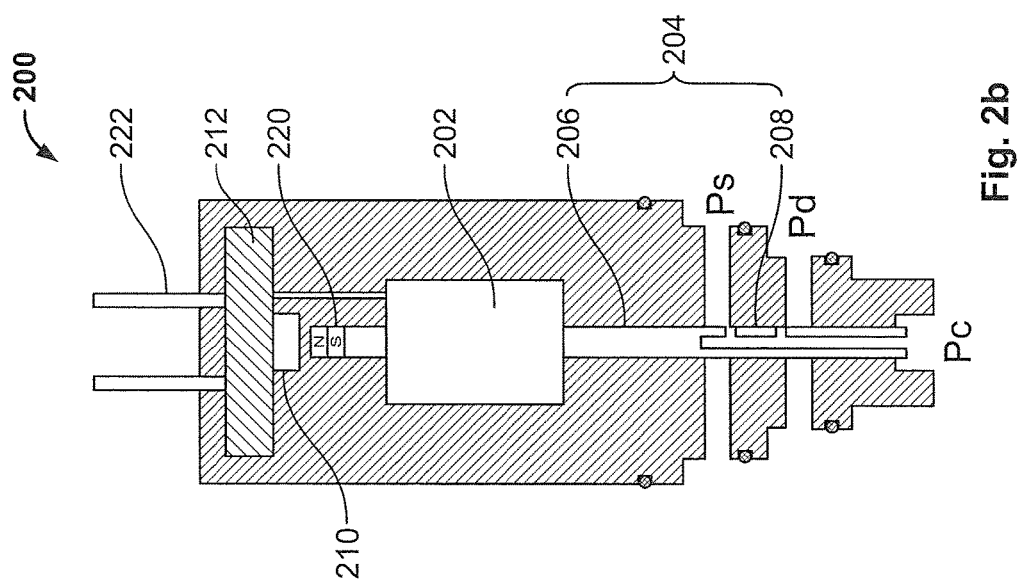
FIG. 2c is a sectional view of the control valve of FIG. 2a in a second position.

A control valve 200 according to the invention is shown generally in FIGS. 2a, 2b, and 2c. The control valve 200 is used in an air conditioning compressor for controlling a refrigerant flow from a high-pressure area Pd into a crankcase pressure area Pc or from the crankcase pressure area Pc into a low-pressure area Ps.

The control valve 200, as shown in FIGS. 2a-2c, has a connection for connecting to the high-pressure area Pd, a connection for connecting to the crankcase pressure area Pc, and a connection for connecting to a low-pressure area Ps of the air conditioning compressor. The control valve 200 also has a control piston 204, which can assume two different positions in the control valve 200. The control piston 204 comprises an actuation rod 206 with at least one seal body 208. The control piston 204 is a hollow needle having a recess oriented longitudinally relative to the control valve 200, the recess forming the passage between the areas of the control valve 200. The seal body 208 is conical and cooperates with an annular recess Pd and/or Ps in a casing of the control valve 200 between the high-pressure area Pd and the crankcase pressure area Pc, and between the crankcase pressure area Pc and the low-pressure area Ps.

In the first of the two different positions, the control piston 204 connects the high-pressure area Pd to the crankcase pressure area Pc. In the second of the two different positions, the control piston 204 connects the crankcase pressure area Pc to the low-pressure area Ps. Actuation of the control valve 200 takes place through the positioning of the control piston 204 in the two positions, in which a passage from the high-pressure area Pd into the crankcase pressure area Pc and from the crankcase pressure area Pc into the low-pressure area Ps respectively is appropriately opened or blocked by the control piston 204.

The control valve 200, as shown in FIGS. 2a-2c, also has an electric motor 202 moving the control piston 204 back and forth between the two positions. The electric motor 202 has a stator and a rotor and moves the control piston 204 between the two positions by means of rotation. The rotational movement of the electric motor 202 is advantageous in the context of the invention, because positioning of the control piston 204 can be carried out at a precise angle. The electric motor 202 has a gearing mechanism, such as a worm gearing mechanism or bevel gearing mechanism, which translates rotational movement of the motor 202 into a translational movement to move the control piston 204 between the two different positions. The motor 202 is at high torque in the two different positions, and consequently, the blocked passage is reliably sealed.

The control valve 200, as shown in FIGS. 2a-2c, also has a sensor 210 that determines the position of the control piston 204 moved by the electric motor 202, and a control unit 212 connected to the sensor 210 and the electric motor 202 which, depending on the position of the control piston 204 determined by the sensor 210, controls refrigerant flow by means of movement of the control piston 204 by the electric motor 202. Deviations between a target position and an actual position of the control piston 204 are determined in the control unit 212 by the sensor 210, and the control unit 212 triggers the motor 202 using the target position and the actual position, minimizing disturbances and allowing for a more precise positioning of the control piston 204.

A casing of the control valve 200 guides the movement of the control piston 204 between the two different positions. Further, the movement of the control piston 204 takes place in the form of a helical movement or in the form of a straight movement between the two positions. In the case of a helical movement, particularly precise positioning of the control piston 204 by the electric motor 202 is enabled because the forward and backward movement of the control piston 204 is set depending on an angle of rotation and a helical characteristic curve.

The sensor 210 is a Hall sensor; the position of the control piston 204 is determined by changes in a magnetic field of the Hall sensor 210.

In an embodiment, the Hall sensor 210 can determine at least one of the two different positions of the control piston 204 without being moved; a measured magnetic field strength is compared with a stored reference value correlated to the at least one of the two different positions.

In another embodiment, the Hall sensor 210 is adapted such that a measured change in the magnetic field strength is compared to a triggering signal of the electric motor 202 for moving the control piston 204. For example, if the electric motor 202 is triggered with a uniform signal, it moves the control piston 204 linearly between the two positions. As the control piston 204 moves away from the Hall sensor 210, the measured change in the magnetic field strength reduces the further away from the Hall sensor 210 the control piston 204 gets. Consequently, the distance and thus the position of the control piston 204 can also be ascertained in this way by the Hall sensor 210.

In an embodiment, an end of the control piston 204 facing the sensor 210 has a permanent magnet disposed thereon to change the magnetic field of the Hall sensor 210. The permanent magnet can be laterally arranged so that a construction height of the control valve 200 is minimized. In a further embodiment, the Hall sensor 210 is designed to surround the permanent magnet of the control piston 204 in at least one of the two different positions to shield the emitted magnetic field from external disturbances. The Hall sensor 210 surrounding the permanent magnet also allows calibration of the sensor 210 independent of disturbances, permitting accurate compensation for, for example, temperature fluctuations and corresponding improved position determination.

In another embodiment, the end of the control piston 204 facing the sensor 210 is formed from a metal or a metal alloy to change the magnetic field of the Hall sensor 210 indirectly by shielding or focusing. The sensor 210 can be small in this embodiment, as the metal end of the control piston 204 does not need to be flush with the sensor 210.

In another embodiment, the electric motor 202 is a servomotor integrated with the sensor 210. The sensor 210 in this configuration detects the position of the control piston 204 by detecting the rotational position of the motor 202 shaft and using a known transmission ratio of the gearing mechanism.

The control unit 212 is designed such that, depending on the position of the control piston 204 determined by the sensor 210 and on a pulse-width modulated (hereinafter, "PWM") input signal, the refrigerant flow is controlled by means of movement of the control piston 204 by the electric motor 202. For example, the PWM input signal has a frequency of 400 Hz, or in other words a pulse-width duration of 1/400 of a second. This guarantees backwards compatibility with existing air conditioning compressors for the triggering of which a PWM input signal is provided. The power provided by the pulse-width modulated input signal may further be used for moving the control piston 204 by the motor 202 and for ascertaining the position of the control piston 204 by the sensor 210. As a result, an additional power supply to the control valve 200 is unnecessary. The control valve 200, as shown in FIGS. 2a-2c, has an electrical connection 222 which is connected to the control unit 212 and via which the pulse-width modulated input signal, for example, is input.

With reference to FIGS. 2a, 2b and 2c, three example positions of the control piston 204 in the control valve 200 according to the invention will be explained in greater detail hereafter according to an exemplary embodiment. As described above, the control valve 200 makes possible the flow of refrigerant from the high-pressure area Pd into the crankcase pressure area Pc and from the crankcase pressure area Pc into the low-pressure area Ps respectively, in an air conditioning compressor. The electric motor 202 moves the actuation rod 206 in the longitudinal direction of the control valve 200, and due to a mechanical coupling between the actuation rod 206 and the seal body 208, the movement is transmitted to the seal body 208.

If the control piston 204 is moved into a first position, shown in FIG. 2a, the seal body 208 opens the passage between the high-pressure area Pd and the crankcase pressure area Pc. As a consequence, refrigerant can flow from the high-pressure area Pd into the crankcase pressure area Pc of an air conditioning compressor and provides a rise in pressure in the crankcase. The first position of the control valve results in the air conditioning compressor being regulated downwards. Further, in the first position, the passage between the crankcase pressure area Pc and the low-pressure area Ps is sealed or blocked. As a consequence, no refrigerant can flow from the crankcase pressure area Pc into the low-pressure area Ps and provide a fall in pressure in the crankcase.

If the control piston 204 of the control valve 200 is moved into a second position, shown in FIGS. 2b and 2c, the seal body 208 opens the passage between the crankcase pressure area Pc and the low-pressure area Ps. Refrigerant can consequently flow from the crankcase pressure area Pc into the low-pressure area Ps of the air conditioning compressor and provide a fall in pressure in the crankcase. The second position of the control valve results in the air conditioning compressor being regulated upwards. Further, in the second position, the passage between the high-pressure area Pd and the crankcase pressure area Pc is sealed or blocked. As a consequence, no refrigerant can flow from the high-pressure area Pd into the crankcase pressure area Pc and provide a rise in pressure in the crankcase.

The control unit 212 controls the control piston 204 to move between the two positions, such that a cross-section of the connection between the high-pressure area Pd and the crankcase pressure area Pc and between the crankcase pressure area Pc and the low-pressure area Ps of the is continuously variable. The control piston 204 is consequently positionable not only in the first position, in which the control valve 200 connects the high-pressure area Pd and the crankcase pressure area Pc to one another, and in the second position, in which the control valve 200 connects the crankcase pressure area Pc and the low-pressure area Ps to one another, but rather is also brought into intermediate positions situated between the first and second position. Thus the first and the second positions of the control piston 204 correspond to positions of maximum displacement with regard to the movement of the control piston 204.

FIG. 2b shows an intermediate position of the control piston 204 corresponding to the partial upward regulation of the air conditioning compressor. In this intermediate position, the cross-section of the channel controlled by the position of the control piston 204 is reduced between the crankcase pressure area Pc and the low-pressure area Ps. The control piston 204 is positioned such that an opening in the control piston 204, which unblocks the channel between the crankcase pressure area Pc and the low-pressure area Ps, is provided offset from one of the recesses Pc and Ps in the casing of the control valve 200 for the connection of the crankcase pressure area Pc and the low-pressure area Ps. In another intermediate position, the control piston 204 can also be positioned such that an opening in the control piston 204, which unblocks the channel between the high-pressure area Pd and the crankcase pressure area Pc, be provided offset from one of the recesses Pd and Pc in the casing of the control valve 200 for the linking of the high-pressure area Pd and the crankcase pressure area Pc. This corresponds to a partial downward regulation of the air conditioning compressor.

The control piston 204 is designed such that a connection between all three of the high-pressure area Pd, the crankcase pressure area Pc, and the low-pressure area Ps is not possible in any intermediate position. Thus, the possibility of a short circuit between the high-pressure area Pd and the low-pressure area Ps is eliminated.

Advantageously, the movement of the control piston 204 by rotation from the motor 202 enables precise positioning of the control piston 204 so that no additional compensating of counterpressure acting on the seal body 208 is required. The use of the motor 202 also enables a stronger feed force in the movement of the control piston 204 between the two different positions of the control valve, as a result of which, for example, the refrigerant flow from a high-pressure area Pd into a crankcase pressure area Pc can be better blocked. Furthermore, the control piston 204 has no hysteresis, no holding current is required giving increased energy efficiency, positioning is improved using the sensor 210, and an overall size and weight of the control valve 200 is reduced.

What is claimed is:

1. A control valve for an air conditioning compressor, comprising:
   a control piston connecting a refrigerant flow between a high-pressure area and a crankcase pressure area in a first position and connecting the refrigerant flow between the crankcase pressure area and a low-pressure area in a second position;
   an electric motor having a gearing mechanism translating a rotational movement of the electric motor into a translational movement of the control piston between the first position and the second position;
   a sensor determining the position of the control piston, the sensor is a Hall sensor;
   a permanent magnet disposed on an end of the control piston opposite the Hall sensor, a distance between the permanent magnet and the Hall sensor changes as the control piston moves between the first position and the second position and the position of the control piston is determined as a change in a magnetic field;
   a control unit connected to the sensor and the electric motor, the control unit controlling the electric motor to move the control piston and control the refrigerant flow based on the position of the control piston determined by the sensor; and
   a casing guiding movement of the control piston between the first position and the second position, the electric motor has a fixed position in the casing as the control piston moves between the first position and the second position, the control piston extends through the electric motor with the permanent magnet disposed on an opposite side of the electric motor from a portion of the control piston disposed adjacent the high-pressure area and the low-pressure area.

2. The control valve of claim 1, wherein a first cross-section of a first connection through the control piston between the high-pressure area and the crankcase pressure area and a second cross-section of a second connection through the control piston between the crankcase pressure area and the low-pressure area are continuously variable between the first position and the second position.

3. The control valve of claim 1, wherein the control piston has an actuation rod and a seal body disposed between the actuation rod and the casing.

4. The control valve of claim 3, wherein the seal body cooperates with a first annular recess in the casing between the high-pressure area and the crankcase pressure area and a second annular recess in the casing between the crankcase pressure area and the low-pressure area.

5. The control valve of claim 1, wherein the electric motor moves the control piston between the first position and the second position by a helical movement.

6. The control valve of claim 1, wherein the electric motor moves the control piston between the first position and the second position by a straight movement.

7. The control valve of claim 1, wherein the gearing mechanism is a worm gearing mechanism or a bevel gearing mechanism.

8. The control valve of claim 1, wherein the Hall sensor surrounds the permanent magnet in at least one of the first position and the second position.

9. The control valve of claim 1, wherein the end of the control piston opposite the Hall sensor is formed from a metal or a metal alloy.

10. The control valve of claim 1, wherein the Hall sensor determines at least one of the first position and the second position without being moved.

11. The control valve of claim 1, wherein the control unit receives a pulse-width modulated input signal to control the refrigerant flow.

12. The control valve of claim 11, wherein a power provided by the pulse-width modulated input signal is used to both move the control piston by the motor and by the sensor to determine the position of the control piston.

13. An air conditioning compressor, comprising:
   a control valve having a control piston connecting a refrigerant flow between a high-pressure area and a crankcase pressure area in a first position and connecting the refrigerant flow between the crankcase pressure area and a low-pressure area in a second position, an electric motor having a gearing mechanism translating a rotational movement of the electric motor into a translational movement of the control piston between the first position and the second position, a sensor determining the position of the control piston, the sensor is a Hall sensor, a permanent magnet disposed on an end of the control piston opposite the Hall sensor, a distance between the permanent magnet and the Hall sensor changes as the control piston moves between the first position and the second position and the position of the control piston is determined as a change in a magnetic field, a control unit connected to the sensor and the electric motor, the control unit controlling the electric motor to move the control piston and control the refrigerant flow based on the position of the control piston determined by the sensor, and a casing guiding movement of the control piston between the first position and the second position, the electric motor has a fixed position in the casing as the control piston moves between the first position and the second position, the control piston extends through the electric motor with the permanent magnet disposed on an opposite side of the electric motor from a portion of the control piston disposed adjacent the high-pressure area and the low-pressure area.

14. The control valve of claim 1, wherein the electric motor is a servomotor comprising the sensor.

* * * * *